(12) United States Patent
Steinigk et al.

(10) Patent No.: US 11,001,183 B2
(45) Date of Patent: May 11, 2021

(54) ADAPTER FOR A GRAB HANDLE IN THE INTERIOR OF A MOTOR VEHICLE

(71) Applicant: Volkswagen Aktiengesellschaft, Wolfsburg (DE)

(72) Inventors: Steffen Steinigk, Magdeburg (DE); Martin Habrom, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/655,880

(22) Filed: Oct. 17, 2019

(65) Prior Publication Data

US 2020/0122620 A1 Apr. 23, 2020

(30) Foreign Application Priority Data

Oct. 17, 2018 (DE) ...................... 10 2018 217 800.3

(51) Int. Cl.
*B60N 3/02* (2006.01)

(52) U.S. Cl.
CPC ............. *B60N 3/023* (2013.01); *B60N 3/026* (2013.01)

(58) Field of Classification Search
CPC ................................ B60N 3/023; B60N 3/026
USPC ....................................................... 296/1.02
See application file for complete search history.

(56) References Cited

U.S. PATENT DOCUMENTS

| 6,340,169 | B1 | 1/2002 | Tietze | |
|---|---|---|---|---|
| 8,764,087 | B2* | 7/2014 | Specht | B60N 3/026 296/1.02 |
| 2004/0140682 | A1* | 7/2004 | Ito | B60N 3/026 296/1.02 |
| 2014/0312643 | A1* | 10/2014 | Chikada | B60N 3/02 296/71 |

FOREIGN PATENT DOCUMENTS

| CA | 2832051 A1 * | 4/2014 | ............ B60N 3/026 |
|---|---|---|---|
| DE | 8137175 U1 | 10/1982 | |
| DE | 10022111 A1 | 11/2001 | |
| DE | 2020914 U1 | 10/2003 | |
| DE | 102005053647 B4 | 5/2007 | |
| DE | 102006053783 B4 | 5/2008 | |
| DE | 102008025740 A1 | 12/2009 | |
| DE | 102009048338 A1 | 4/2011 | |
| DE | 102016206323 A1 | 11/2016 | |

(Continued)

*Primary Examiner* — Jason S Morrow
(74) *Attorney, Agent, or Firm* — Muncy, Geissler, Olds & Lowe, P.C.

(57) ABSTRACT

An adapter for a grab handle in the interior of a motor vehicle, having an attachment portion for attaching the adapter to a vehicle body frame and having a retaining portion, which in the mounted state of the adapter, extends starting from the attachment portion in the direction of the vehicle interior and has a region to which a grab handle can be attached, is characterized in that the retaining portion between the attachment portion and the region to which a grab handle can be attached has a plastic formation or a plurality of plastic formations, so that with the forming of a first predetermined buckling line, a bending strength of the (Continued)

retaining portion in a first direction, in which the adapter is typically stressed in an accident situation, is reduced relative to a bending strength in a second direction opposite the first direction.

12 Claims, 3 Drawing Sheets

(56) References Cited

FOREIGN PATENT DOCUMENTS

| | | |
|---|---|---|
| DE | 102015209151 A1 | 12/2016 |
| EP | 1125789 B1 | 8/2001 |
| GB | 2538734 A | 11/2016 |

\* cited by examiner

ADAPTER FOR A GRAB HANDLE IN THE INTERIOR OF A MOTOR VEHICLE

This nonprovisional application claims priority under 35 U.S.C. § 119(a) to German Patent Application No. 10 2018 217 800.3, which was filed in Germany on Oct. 17, 2018, and which is herein incorporated by reference

BACKGROUND OF THE INVENTION

Field of the Invention

The present invention relates to an adapter for a grab handle in the interior of a motor vehicle, having an attachment portion for attaching the adapter to a vehicle body frame and having a retaining portion, which in the mounted state of the adapter extends starting from the attachment portion in the direction of the vehicle interior and has a region to which a grab handle can be attached.

Description of the Background Art

Adapters are usually used to attach a grab handle in the interior of the vehicle. In many vehicles, such a grab handle is disposed above the door opening. The handle can then be used by a user as an aid when entering or exiting. The user thus has greater control over his movement when entering or exiting. Because during use of the handle, the user's center of gravity shifts vertically, in this regard, tensile forces regularly act downwards on the grab handle and thus also on the adapter. The adapter must therefore be sufficiently stable to withstand such a tensile load without permanent deformation.

On the other hand, there is the requirement for motor vehicles to ensure a high active and passive safety in the event of an accident as well. During an accident, an uncontrolled movement of the body of a vehicle occupant is possible, which in fact may be significantly limited by a safety belt and by one or more airbags, but cannot always be fully controlled. Pendulum movements of the upper body can in certain circumstances cause the user's head to hit the grab handle, which can lead to head injuries in unfavorable cases. A requirement for accident safety is therefore to design the grab handle or the adapter such that it is deformable in the event of a compressive load, such as may occur, for example, due to a head impact during an accident, so that the risk of injury to a user is reduced. Various possibilities are known from the prior art for this purpose.

A multipart adapter device is known from DE 10 2006 053 783 B4, which has a deformation element which overlaps with a retaining element and forms a roughly W-shaped profile with it. In the case of normal use, tensile loads are absorbed by the retaining element, and compressive loads in a vehicle accident are absorbed by the deformation element.

DE 10 2008 025 740 A1 describes a retaining plate for a grab handle in a motor vehicle, which has at least one U-shaped section whose opposing legs are connected to one another by a support strut. The support strut is configured such that it yields under a compressive load and deforms, so that the two opposite legs of the U-shaped section can approach each other. In contrast, in the event of a tensile load, the support strut stabilizes the retaining plate by preventing the two legs from moving apart beyond the length of the support strut.

DE 10 2009 048 338 A1 in various embodiments also describes fastening devices for a grab handle, which are either made of multiple parts and thus enable distribution of tensile and compressive loads to different components, or have a rough box-shaped profile, which deforms to varying degrees by tensile or compressive loads.

The solutions known from the prior art are relatively complex in design and often require a relatively large installation space. It is therefore the object of the present invention to provide an adapter of the type described above, which is simple to manufacture and meets the different requirements for deformation behavior under tensile and compressive loads.

SUMMARY OF THE INVENTION

It is therefore an object of the present invention to provide a generic adapter in which the retaining portion between the attachment portion and the region to which a grab handle can be attached has a plastic formation or a plurality of plastic formations, so that with the forming of a first predetermined buckling line, a bending strength of the retaining portion in a first direction, in which the adapter is typically stressed in an accident situation, is reduced relative to a bending strength in a second direction opposite the first direction. The object is further achieved by a motor vehicle having such an adapter.

A plastic formation can be understood to mean, for example, a shape which has a three-dimensional curvature and thus modifies the bending strength of the adapter simultaneously in a number of directions. In other words, such a plastic formation can have at least three points on the surface of the formation whose normal vectors are skewed to one another. The plastic formation differs from a simple bent or buckled sheet in that it cannot be produced just by a simple bending or buckling process, but is created by modifying the surface topography of the adapter in at least two mutually different directions.

The adapter of the invention has the advantage that the behavior of the component under tensile loads and under compressive loads can be adjusted largely independently of one another by the skillful shaping of the plastic formations. Furthermore, compared to the multipart solutions known from the prior art, this results in a simpler design and a savings of materials and thus weight.

The attachment portion and the retaining portion can form an angle between 40° and 120°, preferably between 70° and 100°, with one another. To determine the angle formed by the attachment portion and the retaining portion with one another, imaginary planes are considered that approximately describe the course of the respective elements. In other words, the angle between two balancing planes is considered, each passing through the attachment portion and the retaining portion. The adapter is then adapted to the typical application and the usual conditions in the interior of a motor vehicle. The specified configuration has the result that the attachment portion can be attached above a vehicle door in the transition region to the vehicle headliner and that the retaining portion extends substantially horizontally into the vehicle interior, so that the grab handle is easily accessible and usable for a user.

The retaining portion can be designed flat. In other words, an extension of the retaining portion in the direction transverse to the plane in which the retaining portion extends is substantially smaller than in the direction of this plane, which coincides substantially with the horizontal in the vehicle-installed state.

The attachment portion can also be designed flat or even substantially planar. It then lies particularly flat on the body frame of the vehicle and does not protrude into the vehicle interior.

In an embodiment particularly suitable for attaching a grab handle, the retaining portion can be designed as multiple parts. In particular, the retaining portion can be designed as two parts. In this case, the distance between the two sections or the first retaining portion and the second retaining portion is expediently approximately so large that, when the grab handle is mounted, sufficient space for a user's hand remains between the two retaining portions. The distance can be, for example, 15-20 cm.

The retaining portion or retaining portions can be designed tab-shaped and have a circumferential collar on three sides. The plastic formation can then be arranged in the region of the aforementioned collar. In other words, the collar contour is modified and produces, for example, a convex outwardly facing protrusion. The collar can point upwards, so that overall an upwardly open, tub-like structure is created.

Advantageously, a plastic formation can be disposed on the retaining portion or retaining portions both on the front side as seen in the conventional direction of travel of the vehicle in the vehicle-installed state and on the rear side as seen in the conventional direction of travel of the vehicle. The retaining portion is then designed substantially flat in the region between the plastic formation on the front side and the plastic formation on the rear side. The plastic formations are thus each exclusively located in the edge region of the retaining portion or retaining portions.

The plastic formation can be designed three-dimensional and curves convexly toward the vehicle interior. Such a shaping of the plastic formation causes the retaining portion to deform relatively readily under a compressive load, because the convex portion can be compressed or "folded together." In contrast to tensile loads, the retaining element, however, is more dimensionally stable, because this would require an elongation or stretching of the material and no predetermined deformation path is available.

The retaining portion or retaining portions can have at least one slot-shaped recess between the plastic formations. This recess can be used for attaching a holder for cables, belonging to the electrical or electronic components of the vehicle, to the adapter and/or to the vehicle body frame. Furthermore, the recess reduces the bending strength of the retaining element under a compressive load. The plastic formations can form the first predetermined buckling line together with the recess. Accordingly, then there is at least one slot-shaped recess on the first predetermined buckling line.

A connecting region between the retaining portion and the attachment portion can have a side wall, which is oriented substantially perpendicular to both the attachment portion and the retaining portion. If the retaining portion as described above has a collar, then the collar may be formed integrally on the attachment element and merge smoothly into it.

The attachment portion can have recesses in the vicinity of the retaining portion or retaining portions as seen in the conventional direction of travel in the vehicle-installed state in each case before the retaining portion or retaining portions and behind the retaining portion or retaining portions. These have the effect that the attachment portion can also deform under a compressive load acting on the retaining portion or retaining portions. The retaining portion or retaining portions together with the attachment portion that lies between the recesses can then perform a rotational movement about a second predetermined buckling line. In this case, the attachment portion can at least partially detach itself from the vehicle inner wall, against which it normally lies flat, in an area between the recesses and move away from the wall. The recesses can extend perpendicular to a longitudinal direction which extends in the direction of the greatest extent of the attachment portion, and, for example, can comprise a length of 30% to 50% of the extent of the attachment portion transversely to its longitudinal direction. The longitudinal direction in the installed state in the vehicle usually corresponds to the conventional direction of travel of the vehicle.

The recesses or separation cuts can be disposed between attachment points, at which the attachment portion is connected to the vehicle body, and the retaining elements. The attachment points can be, for example, screw connections or weld points. The attachment portion is fixedly connected to the body frame at these points. Although the attachment portion lies flush and flat against the interior wall of the vehicle between the attachment points, it is not connected to it. In the case of a compressive load, for example, due to a head impact, in particular in combination with the recesses, it is achieved that the region of the attachment element located between the attachment points at least partially separates from the vehicle interior wall and executes a rotating or pivoting movement about a second predetermined buckling line extending parallel to the interior wall in the upper region of the retaining element.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
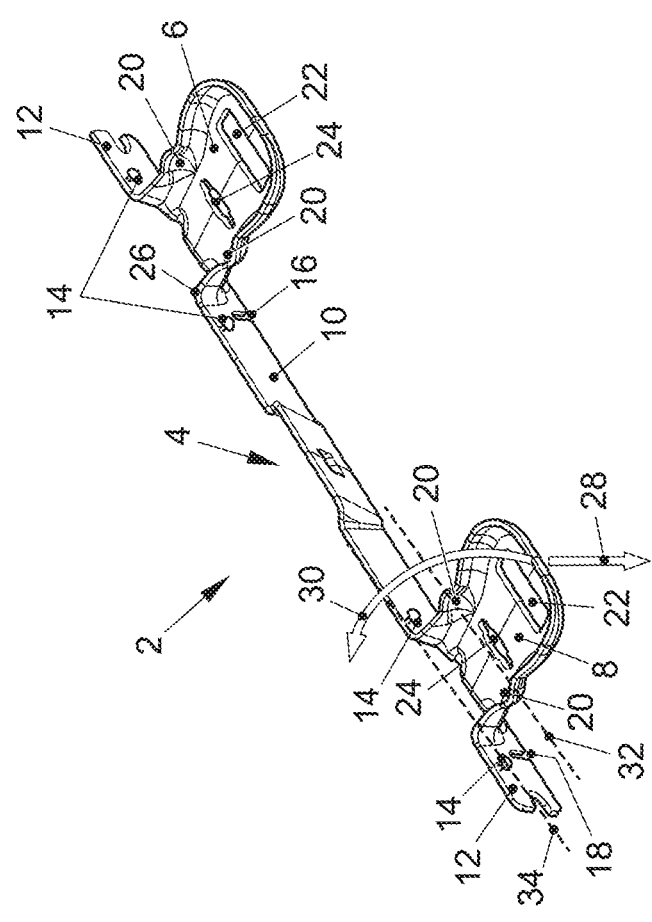
FIG. 1 shows an exemplary embodiment of an adapter of the invention in a view obliquely from above.

FIG. 1 shows an exemplary embodiment of an adapter 2 of the invention in a view obliquely from above. Adapter 2 has a attachment portion 4, with which the adapter can be attached to a vehicle body structure. Further, adapter 2 has a first retaining portion 6 and a second retaining portion 8, which are integrally formed on attachment portion 4 and extend from it at an angle of approximately 90° toward the vehicle interior. Attachment portion 4 has the shape of an elongated, flat metal sheet. In particular, middle section 10, which is disposed between first retaining portion 6 and second retaining portion 8, as well as the two outer sections 12 extend substantially in a planar manner.

Attachment portion 4 is connected to the body frame at attachment points 14. A screw connection, a welded connection, or another conventional connection can be made for this purpose.

Retaining portions 6, 8 extend as already described into the space of the vehicle interior. They are designed accordingly as tabs, which protrude into the vehicle interior and have a flat base area and a substantially perpendicular side wall which is circumferential on three sides. The corners of retaining portions 6, 8 which corners point toward the vehicle interior, are formed rounded. Likewise, the transition region between the flat base area and the side walls is formed rounded. Retaining portions 6, 8 each have a receiving cutout 22, to which the actual grab handle can be attached.

Retaining portions 6, 8 have formations 20 which, starting from the just described basic structure of retaining portions 6, 8 represent convex bulges outwards towards the vehicle interior. Formations 20 lie on first predetermined buckling line 32, which is created by formations 20. In the case of an upwardly acting compressive load, which exceeds a critical magnitude, the part of retaining portion 8 that lies to the right of first predetermined buckling line 32, as seen in the figure, performs a rotational movement about first predetermined buckling line 32. This is indicated by arrow 30. This results in a plastic deformation of second retaining portion 8. The same applies, of course, to first retaining portion 6. In the case of a tensile load downwards, as indicated by arrow 28, in contrast, there is at most a short-term elastic deformation of second retention portion 8.

Retaining portions 6, 8 in the illustrated exemplary embodiment have cable carrier cutouts 24, which lie in the region of first predetermined buckling line 32. Cable carrier cutouts 24 can be used for a start to attach a cable holder or cable carrier and thus to use the adapter not only for holding the grab handle, but also for the electrical or electronic cabling. Furthermore, the bending strength of retaining portions 6, 8 is further reduced by these cable carrier cutouts, so that in addition to formations 20, a further adjustment parameter results, which can be used to adjust the behavior of adapter 2 in an accident situation.

The entire adapter 2 is designed in one piece. In this regard, sharp corners and edges have been largely avoided. Formation regions 26 are also formed rounded in the transition between attachment portion 4 and retaining portions 6, 8.

Recesses 16 and 18 are disposed in attachment portion 4. These recesses can also be referred to as separation cuts and cut through attachment portion 4 in each case partially starting from below. Separation cuts 16, 18 are respectively disposed between attachment points 14 and retaining elements 6, 8 or formation regions 26. In the case of a compressive force acting from below, a twisting of attachment portion 4 about a second predetermined buckling line 34 thus becomes possible. The largest part of middle section 10 and outer sections 12 of attachment portion 4 remains in contact with the interior wall. The region between one of the separation cuts 16 and 18, which in each case includes one of the retaining portions 6, 8 partly detaches from the vehicle inner wall, however, and then, together with the corresponding retaining portion 6, 8 executes a rotational movement about second predetermined breaking line 34.

In the illustrated exemplary embodiment, two separate mechanisms are thus realized in principle, with which a controlled deformation of adapter 2 can be achieved in an accident situation.

Figure 2:
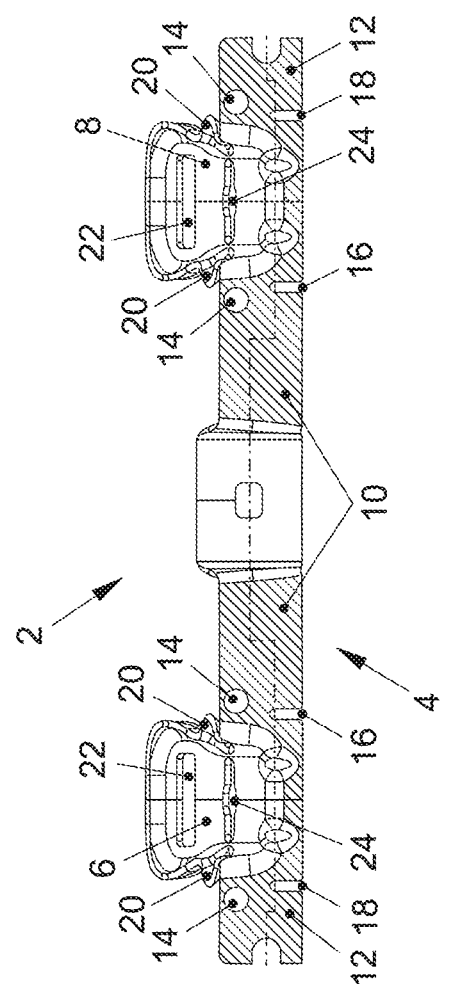
FIG. 2 shows the adapter in a further view.

FIG. 2 shows a further view of adapter 2 from a perspective approximately perpendicular to the plane of attachment portion 4. In this illustration, all four attachment points 14 shown and separation cuts 16 and 18 are particularly clearly visible. It becomes clear that separation cuts 16 and 18 are disposed in the vicinity of attachment points 14, but somewhat closer to retaining elements 6, 8 than attachment points 14. Separation cuts 16, 18 are disposed in the lower region of attachment portion 4 and cut through attachment element 4 to slightly less than half of its vertical extent. Attachment points 14, in contrast, are disposed in the upper region of attachment portion 4 and thus opposite separation cuts 16, 18.

Furthermore, the design of plastic formations 20 is clearly visible. It can be seen that plastic formation 20 is visible in the contour of the side wall owing to an outward protrusion. The protrusion in the installed state of adapter 2 projects into the vehicle interior.

Figure 3:
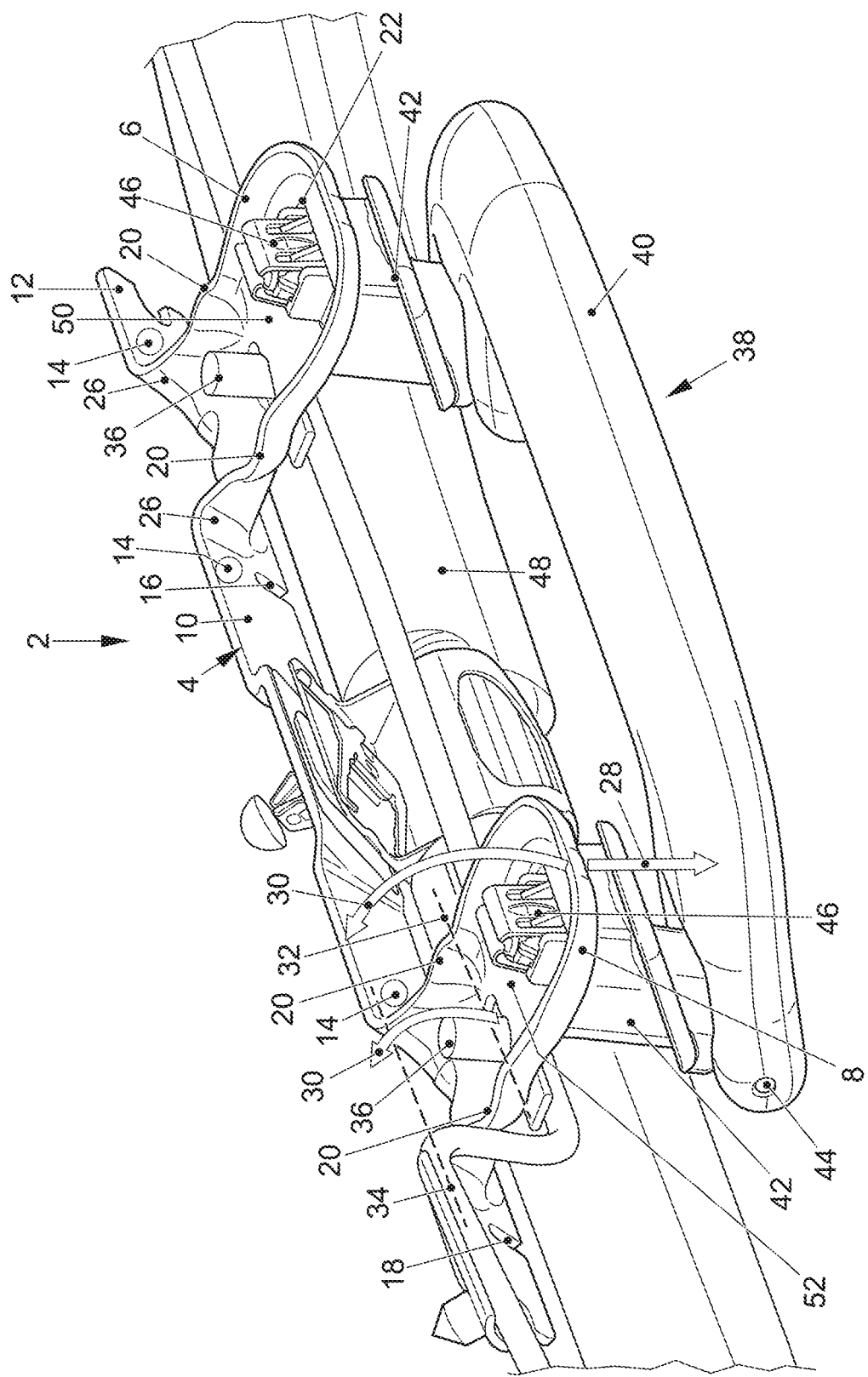
FIG. 3 shows an adapter of the invention in an installed state.

FIG. 3 shows adapter 2 when installed in the vehicle, wherein for the sake of clarity, a large part of the vehicle is not shown. Grab handle 38 consisting of a movable handle portion 40, which can be pivoted about pivot axis 44, and an immovable portion 42 is attached to retaining portions 6, 8 by means of retaining clips 46. Arrow 28 again indicates a load due to a tensile force when grab handle 38 is used, whereas arrow 30 describes the deformation of second retaining portion 8, when a compressive force is applied to it, about first predetermined buckling line 32 and about second predetermined buckling line 34.

Cable carriers 36, which are used to hold cable, are inserted in the previously described cable carrier cutouts. Further, head airbag 48 held by a retaining clip can be seen in the background. Likewise, the tub-like shape of retaining portions 6, 8 becomes clear once again. They each have a substantially flat base area 50, 52 and the side walls adjacent thereto, which are connected to these starting from base areas 50, 52 via a curvature with a relatively small radius. Plastic formations 20 are part of these side walls and have the shape of outwardly directed bulges.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An adapter for a grab handle in the interior of a motor vehicle, the adapter comprising:
   an attachment portion to attach the adapter to a vehicle body frame;
   a retaining portion, which in a mounted state of the adapter, extends, starting from the attachment portion, in a direction of the vehicle interior and has a region to which a grab handle is adapted to be attached; and
   at least one plastic formation disposed on the retaining portion between the attachment portion and the region to which the grab handle is adapted to be attached so that with the forming of a first predetermined buckling line, a bending strength of the retaining portion in a first direction, in which the adapter is typically stressed in an accident situation, is reduced relative to a bending strength in a second direction opposite the first direction,
   wherein the retaining portion has a base and a side wall that extends perpendicularly from the base, and wherein the at least one plastic formation is designed three-dimensional and curves convexly outward from the side wall, such that the at least one plastic formation curves convexly toward the motor vehicle interior.

2. The adapter according to claim 1, wherein the attachment portion and the retaining portion form an angle between 40° and 120° with one another.

3. The adapter according to claim 1, wherein the attachment portion is substantially planar.

4. The adapter according to claim 1, wherein a first one of the at least one plastic formation is disposed on a front side of the retaining portion as seen in the direction of travel of the motor vehicle in the vehicle-installed state and a second one of the at least one plastic formation is disposed on a rear side of the retaining portion in the direction of travel of the motor vehicle.

5. An adapter for a grab handle in the interior of a motor vehicle, the adapter comprising:
 an attachment portion to attach the adapter to a vehicle body frame;
 a retaining portion, which in a mounted state of the adapter, extends, starting from the attachment portion, in a direction of the vehicle interior and has a region to which a grab handle is adapted to be attached; and
 at least one plastic formation disposed on the retaining portion between the attachment portion and the region to which the grab handle is adapted to be attached so that with the forming of a first predetermined buckling line, a bending strength of the retaining portion in a first direction, in which the adapter is typically stressed in an accident situation, is reduced relative to a bending strength in a second direction opposite the first direction,
 wherein a first one of the at least one plastic formation is disposed on a front side of the retaining portion as seen in the direction of travel of the motor vehicle in the vehicle-installed state and a second one of the at least one plastic formation is disposed on a rear side of the retaining portion in the direction of travel of the motor vehicle, and
 wherein the retaining portion has at least one slot-shaped recess between the first one and the second one of the at least one plastic formation.

6. The adapter according to claim 5, wherein the at least one slot-shaped recess is adapted to attach an electrical cable to the adapter and/or to the vehicle body frame.

7. An adapter for a grab handle in the interior of a motor vehicle, the adapter comprising:
 an attachment portion to attach the adapter to a vehicle body frame;
 a retaining portion, which in a mounted state of the adapter, extends, starting from the attachment portion, in a direction of the vehicle interior and has a region to which a grab handle is adapted to be attached; and
 at least one plastic formation disposed on the retaining portion between the attachment portion and the region to which the grab handle is adapted to be attached so that with the forming of a first predetermined buckling line, a bending strength of the retaining portion in a first direction, in which the adapter is typically stressed in an accident situation, is reduced relative to a bending strength in a second direction opposite the first direction,
 wherein the attachment portion has recesses in a vicinity of the retaining portion, wherein, as seen in the direction of travel of the motor vehicle in the vehicle-installed state, a first one of the recesses is provided before the retaining portion and a second one of the recesses is provided behind the retaining portion.

8. The adapter according to claim 7, wherein the recesses bring about a formation of a second predetermined buckling line.

9. A motor vehicle comprising an adapter according to claim 1.

10. The adapter according to claim 1, wherein the attachment portion and the retaining portion form an angle between 70° and 100° with one another.

11. The adapter according to claim 1, wherein two of the retaining portion are provided such that the adapter includes two retaining portions, wherein a first one of the two retaining portions is provided adjacent a first end of the attachment portion and a second one of the two retaining portions is provided adjacent a second end of the attachment portion.

12. The adapter according to claim 4, wherein the first one and the second one of the at least one plastic formation are aligned in the direction of travel of the motor vehicle.

\* \* \* \* \*